(12) United States Patent
McHenry (10) Patent No.: US 7,146,176 B2
(45) Date of Patent: Dec. 5, 2006

(54) SYSTEM AND METHOD FOR REUSE OF COMMUNICATIONS SPECTRUM FOR FIXED AND MOBILE APPLICATIONS WITH EFFICIENT METHOD TO MITIGATE INTERFERENCE

(75) Inventor: Mark Allen McHenry, McLean, VA (US)

(73) Assignee: Shared Spectrum Company, Vienna, VA (US)

( * ) Notice: Subject to any disclaimer, the term of this patent is extended or adjusted under 35 U.S.C. 154(b) by 689 days.

(21) Appl. No.: 09/877,087

(22) Filed: Jun. 11, 2001

(65) Prior Publication Data

US 2002/0002052 A1 Jan. 3, 2002

Related U.S. Application Data

(60) Provisional application No. 60/211,215, filed on Jun. 13, 2000, provisional application No. 60/264,265, filed on Jan. 29, 2001.

(51) Int. Cl.
*H04Q 7/20* (2006.01)

(52) U.S. Cl. ............... 455/454; 455/447; 455/450; 455/452.1; 455/452.2

(58) Field of Classification Search ............ 455/454, 455/447, 450, 452.1, 452.2
See application file for complete search history.

(56) References Cited

U.S. PATENT DOCUMENTS

| | | | |
|---|---|---|---|
| 4,672,657 A | 6/1987 | Dershowitz | |
| 4,736,453 A | 4/1988 | Schloemer | |
| 4,783,780 A | 11/1988 | Alexis | |
| 4,878,238 A | 10/1989 | Rash et al. | |
| 4,881,271 A | 11/1989 | Yamauchi | |
| 4,977,612 A | 12/1990 | Wilson | |
| 5,040,238 A | 8/1991 | Comroe et al. | |
| 5,093,924 A | 3/1992 | Toshiyuki et al. | |
| 5,093,927 A | 3/1992 | Shanley | |
| 5,142,691 A * | 8/1992 | Freeburg et al. ........... 455/63.3 | |
| 5,177,604 A * | 1/1993 | Martinez ................ 725/144 | |
| 5,179,722 A | 1/1993 | Gunmar et al. | |
| 5,203,012 A | 4/1993 | Patsiokas et al. | |
| 5,239,676 A | 8/1993 | Strawczynski et al. | |
| 5,247,701 A | 9/1993 | Comroe et al. | |
| 5,276,908 A * | 1/1994 | Koohgoli et al. ........... 455/454 | |
| 5,375,123 A | 12/1994 | Andersson et al. | |
| 5,402,523 A * | 3/1995 | Berg ..................... 455/450 | |
| 5,410,737 A | 4/1995 | Jones | |
| 5,412,658 A | 5/1995 | Arnold et al. | |

(Continued)

*Primary Examiner*—Matthew Anderson
*Assistant Examiner*—Minh Dao
(74) *Attorney, Agent, or Firm*—Clark & Brody (57) ABSTRACT

A communications system network that enables secondary use of spectrum on a non-interference basis is disclosed. Each secondary transceiver measures the background spectrum. The system uses a modulation method to measure the background signals that eliminates self-generated interference and also identifies the secondary signal to all primary users via on/off amplitude modulation, allowing easy resolution of interference claims. The system uses high-processing gain probe waveforms that enable propagation measurements to be made with minimal interference to the primary users. The system measures background signals and identifies the types of nearby receivers and modifies the local frequency assignments to minimize interference caused by a secondary system due to non-linear mixing interference and interference caused by out-of-band transmitted signals (phase noise, harmonics, and spurs). The system infers a secondary node's elevation and mobility (thus, its probability to cause interference) by analysis of the amplitude of background signals. Elevated or mobile nodes are given more conservative frequency assignments that stationary nodes.

9 Claims, 10 Drawing Sheets

Secondary system sharing the spectrum on a non-interference basis with primary users located in a region isolated by terrain features.

U.S. PATENT DOCUMENTS

| | | |
|---|---|---|
| 5,422,930 A | 6/1995 | McDonald et al. |
| 5,428,819 A | 6/1995 | Wang et al. |
| 5,497,505 A | 3/1996 | Koohgoli et al. |
| 5,511,233 A | 4/1996 | Otten |
| 5,548,809 A | 8/1996 | Lemson |
| 5,608,727 A | 3/1997 | Perreault et al. |
| 5,655,217 A | 8/1997 | Lemson |
| 5,752,164 A | 5/1998 | Jones |
| 5,794,151 A | 8/1998 | McDonald et al. |
| 5,822,686 A | 10/1998 | Lundberg et al. |
| 5,828,948 A | 10/1998 | Almgren et al. |
| 5,850,605 A | 12/1998 | Souissi et al. |
| 5,862,487 A | 1/1999 | Fujii et al. |
| 5,943,622 A | 8/1999 | Yamashita |
| 6,044,090 A | 3/2000 | Grau et al. |
| 6,049,717 A | 4/2000 | Dufour et al. |
| 6,615,040 B1 * | 9/2003 | Benveniste ................ 455/423 |

* cited by examiner

FIG. 1 Secondary system sharing the spectrum on a non-interference basis with primary users located in a region isolated by terrain features.

FIG. 2 New user's interference to primary users in service area B is estimated by signal strength measured by secondary users located in service area B.

FIG. 3 Method secondary system nodes use to determine the power level on each channel.

FIG. 4 Probe waveform (solid) and NTSC TV waveform (dashed). The probe waveform with this amplitude relative to the TV signal or lower causes minimal interference to TV reception.

FIG. 5 Amplitude modulating the secondary signal allows the primary signal strength to be measured.

FIG. 6 Amplitude modulating the secondary signal potential secondary interference to easily be identified by the primary receiver.

FIG. 7 The amplitude modulation of each secondary channel is temporally offset to allow a single secondary receiver to sequentially measure all channels during the period with no secondary signal present.

FIG. 8 Secondary receiver timeline showing data, background signal and probe signal reception.

FIG. 9 Detection of nearby primary node (TV) using local oscillator leakage signal.

FIG. 10 Secondary signal spectrum used when in potential interference situation.

FIG. 11 Secondary signal spectrum used when interference is unlikely.

|  | HIGH MULTIPATH (HIGH DELAY SPREAD) | LOW MULTIPATH (LOW DELAY SPREAD) |
|---|---|---|
| SIGNIFICANT PRIMARY SIGNAL INTERFERENCE | 3.0 MHz bandwidth, OFDM, QPSK, rate 1/2 | 3.0 MHz bandwidth, OFDM, 64-QAM, rate 3/4 |
| MINIMAL PRIMARY SIGNAL INTERFERENCE | 5.5 MHz bandwidth, OFDM, QPSK, rate 1/2 | 5.5 MHz bandwidth, OFDM, 64-QAM, rate 3/4 |

FIG. 12 Secondary waveform selection rules.

FIG. 13 Secondary radio system architecture.

FIG. 14 Method to identify the secondary node causing interference to a primary node.

FIG. 15 Method to determine which secondary transceiver node is causing interference to the primary node.

FIG. 16 Method to determine a secondary transceiver's approximate altitude.

FIG. 17 Method to determine if a secondary transceiver is moving or stationary.

SYSTEM AND METHOD FOR REUSE OF COMMUNICATIONS SPECTRUM FOR FIXED AND MOBILE APPLICATIONS WITH EFFICIENT METHOD TO MITIGATE INTERFERENCE

This application claims priority under 35 USC 119(e) based on of U.S. Provisional Patent Applications Ser. No. 60/211,215 dated Jun. 13, 2000 and Ser. No. 60/264,265 dated Jan. 29, 2001. Both applications are incorporated by reference in entirety.

BACKGROUND

1. Field of Invention

This invention relates to communications spectrum allocation and reuse on a non-interference basis in bands which have pre-existing spectrum users (both transmit/receive type and receive-only type).

2. Description of Prior Art

Communication systems commonly use methods to optimize the use of the spectrum. There are several approaches involving radio networks where channels are selected to optimize system capacity.

Cellular phone and other types of systems use low power transmissions and a cellular architecture that enables spectrum to be reused many times in a metropolitan area. These systems assume that within the allocated frequency band, the system is the primary user and that there is a control or signaling channel between all nodes. The goal of these systems is to maximize the number of calls system wide given a fixed amount of bandwidth. This problem is complex because of the nearly innumerable choices of frequency/channel combinations possible, the time varying nature of the calls, and the unpredictable propagation loses between all of the nodes. While global optimization schemes would give the highest capacities, limited communications capacity between the nodes, finite channel measuring capabilities in some of the nodes, and short decisions times require that distributed non-optimal methods be used. Examples are disclosed in U.S. Pat. Nos. 4,672,657 (1987), 4,736,453 (1988), 4,783,780 (1988), 4,878,238 (1989), 4,881,271 (1989), 4,977,612 (1990), 5,093,927 (1992), 5,203,012 (1993), 5,179,722 (1993), 5,239,676 (1993), 5,276,908 (1994), 5,375,123 (1994), 5,497,505 (1996), 5,608,727 (1997), 5,822,686 (1998), 5,828,948 (1998), 5,850,605 (1998), 5,943,622 (1999), 6,044090 (2000), and 6,049,717 (2000).

The above patents describe methods where current channel measurements (noise level, carrier-to-interference ratio (C/I)), previous channel measurement statistics, and traffic loading are used in different ways to optimize capacity while minimizing latency in channel assignment, equipment requirements, and dropped calls. All of these methods assume that the system is the primary spectrum user. This would allow the primary system to select channels where it was jammed, but it would create significant interference to another system.

Several methods to enable a system to operate as the secondary spectrum user with minimal impact to the primary user have been disclosed. The first type assume that there are predetermined spatial "exclusions zones" where if the secondary user avoids transmission while located in these areas, then there will be no interference to the primary user. U.S. Pat. No. 5,422,930 (1995) uses a telephone circuit based keying method where the telephone's location is known and when the secondary user is connected to the specific phone line, authorization is given for operation using a set of frequencies. U.S. Pat. No. 5,511,233 (1996) is similar method where an undefined position location system is used. U.S. Pat. No. 5,794,1511 (1998) uses a GPS (global positioning system) to locate the secondary user.

This geolocation exclusion method has significant shortfalls. To determine the exclusion zones, propagation estimates or propagation methods would have to be made. There would be large uncertainties in the antenna type, antenna orientation, antenna height, and power level used by the secondary user. There would be uncertainties in the local propagation conditions between the secondary user and the primary user, and these propagation conditions might change because of ducting or other temporary atmospheric conditions. To mitigate these problems, the exclusion zones would have to have very large margins, which would greatly reduce system capacity, or some unintended interference would be created. These schemes do not address how the interference caused by one specific secondary user would be quickly and economically identified and eliminated.

A second type of secondary spectrum allocation method uses detailed propagation modeling of the primary and secondary communication systems and channel occupancy measurements made by the secondary system (U.S. Pat. No. 5,410,737 (1995) and U.S. Pat. No. 5,752,164 (1998)). The channel measurements are use to validate and improve the propagation modeling estimates. Using this information, the spectrum is allocated so that the primary user is not impacted.

Because of the large uncertainties in propagation estimates, the above method must use large margins to insure minimal interference. Using measurements of the propagation losses between the primary and secondary user can be directly used to reduce these margins only if the primary system transmits and receives using the same antenna, at the same frequency and at a known power level. In this case the secondary radio directly estimates it's impact on the primary system and can select its frequency and power level to avoid interference. However, most communication systems use different transmit and receive frequencies and often use different transmit and receive antennas. Hence, the measurements of the primary signal received by the secondary don't provide direct information on the impact the secondary transmitter has on the primary receiver. This method also doesn't describe how unintentional interference would be identified and mitigated.

A third approach insurers that the measurements of the primary signals made by the secondary user can be used to determine the available spectrum is to add a narrow bandwidth "marker" signal to every primary receiver antenna system (U.S. Pat. No. 5,412,658 (1995)). This approach has significant cost impact to the primary user and because the CW marker transmitter is collocated to the primary receiver, it will cause significant interference to the primary user.

A fourth method has the primary and secondary users sharing a spectrum band between the primary and secondary users to reserve bandwidth (U.S. Pat. No. 5,428,819 (1995)). An "etiquette" is observed between the users and each user makes measurements of the open channels to determine priority usage. This method has the disadvantage that the primary system must be modified to communicate with the secondary system, which is cost prohibitive if the primary user is already established. Also, the method will fail in many cases because of the well known "hidden node problem". This occurs when the secondary nodes are unable to receive transmissions from a primary node because of the particular propagation conditions. Thus, the secondary user incorrectly believes the channel is available and his transmissions cause interference.

A fifth method assumes that the primary and secondary systems are controlled by a central controller (U.S. Pat. Nos. 5,040,238 (1991), 5,093,927 (1992), 5,142,691 (1992), and 5,247,701 (1993)). When interference occurs, the secondary system's power level and/or frequency list is adjusted. Some of the methods use channel measurements at the secondary system to detect changes in the frequency usage that would require a re-prioritization of channels. This method has obvious problems because the primary system would have to be highly modified to interact with the secondary system and to be able to make the required spectrum measurements. The spectrum is now fully allocated and there are primary users in every band. What is needed is a method that enables secondary operation without any modification to the existing primary user.

A sixth method uses field monitors the measure the secondary signal strength at specific locations. One sub-method is intended to enable secondary usage inside buildings (U.S. Pat. Nos. 5,548,809 (1996) and 5,655,217 (1997)). Field monitors are located surrounding the secondary system nodes which determine what channels are not used by nearby primary systems or if the channels are in use, if the coupling between the primary to them where the coupling to detected. The second sub-method is intended to enable adjacent cellular based mobile communication systems (U.S. Pat. Nos. 5,862,487 (1999)).

OBJECTIVES AND ADVANTAGES

Accordingly, several objects or advantages of my invention are:

(a) to provide a method to determine what channels a newly installed secondary transceiver can use without causing interference to the primary system while the other secondary transceivers are using the same channels;

(b) to provide a method to determine what channels a newly installed secondary transceiver can use without causing interference to the primary system that has minimal impact to the capacity of the secondary system;

(c) to provide a method to determine what channels a secondary transceiver can use without causing interference to the primary system while the primary system is operating;

(d) to provide a method to determine if a primary receiver is in close proximity to a secondary transceiver which greatly reduces that probability of adjacent channel or "IF image" interference to the proximate primary receiver;

(e) to provide a method to measure propagation losses using a unique waveform that causes minimal interference to TV signals;

(f) to provide a method to measure propagation losses using a unique waveform that causes minimal interference to data signals;

(g) to provide a method to vary the secondary waveform type that improves the capacity of the secondary system while creating minimum interference to the primary system;

(h) to provide a method to modulate the secondary signal so the primary user can quickly and positively if the reception problems are caused by the secondary signal or by other causes;

(i) to provide a method to identify what secondary user is causing interference to a primary user; and (j) to provide a method to precisely and efficiently reduce the transmitter power level of a secondary user that is causing interference to a primary user to a level which doesn't cause interference;

(k) to provide a method to determine if the secondary node is moving indicating that its frequency allocations needs to be checked more frequently or with a different method;

(m) to provide a method to determine if the secondary node is at an elevated position indicating that it is more likely to cause interference to distant primary users and indicating that the very conservative frequency allocation methods should be used;

Further objects and advantages of my invention will become apparent from a consideration of the drawings and ensuing description.

REFERENCE NUMERALS IN DRAWINGS 10 primary receiver
12 primary transmitter
20 secondary transceiver
21 new secondary transceiver
22 secondary base station
24 secondary service area
26 primary service area A
28 primary service area B
30 secondary central controller
40 obstacle
50 antenna 52 amplifier
54 tuner
56 controller
58 programmable modem
60 user device
62 variable attenuator
64 preselect filter

DESCRIPTION

Figure 1:
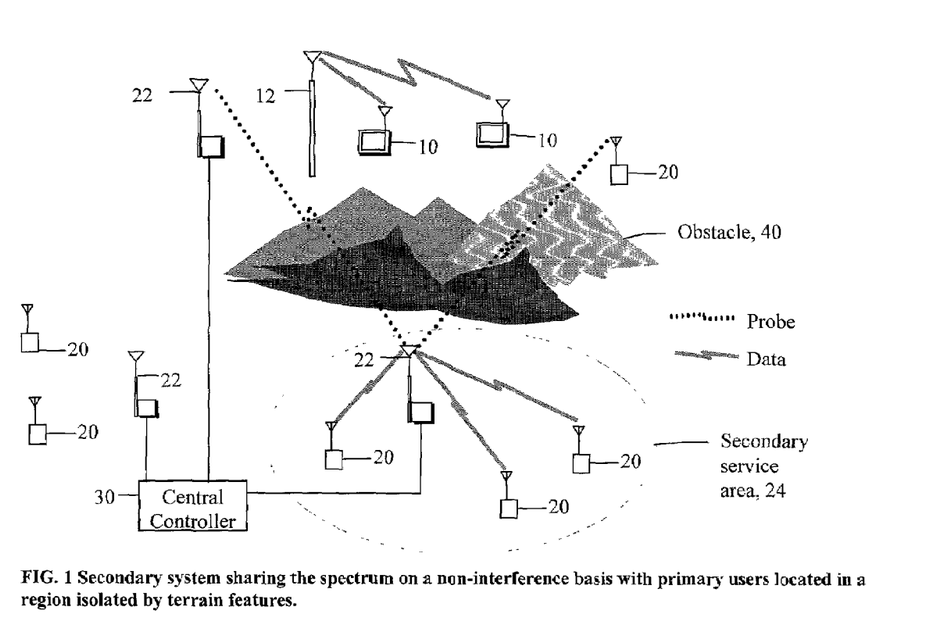
FIG. 1 shows the arrangement of the nodes and illustrates the secondary spectrum usage concept.

This invention allows a secondary user to efficiently use the spectrum on a non-interference basis with an existing primary user. FIG. 1 shows a primary transmitter 12 sending signals to one or more primary receivers 10. Separated by a large distance there is a network of secondary wireless transceivers 20 and secondary base stations 22. The secondary base stations 22 are connected by high capacity wire line or microwave links to a secondary central controller 30. The secondary users that are located within a secondary service area 24 also uses the primary channel, but they don't cause interference to the primary user because the distance and obstacles 40 between sufficiently attenuate the secondary signals radiated to the primary receivers 10. Thus, if the secondary transceivers 20 and 22 always transmit below certain power levels (which are different for each node), then the primary user will not be affected and the spectrum can be re-used.

Determining the secondary transceiver's maximum power level is very difficult since it depends on antennas, cable losses, locations, radio frequency (RF) propagation, and other factors which can't economically be reliably predicted. In the preferred embodiment, a combination of primary signal strength measurements, measurements of signals from nearby primary receivers, and secondary-to-secondary node coupling measurements are made to determine this power level.

Figure 2:
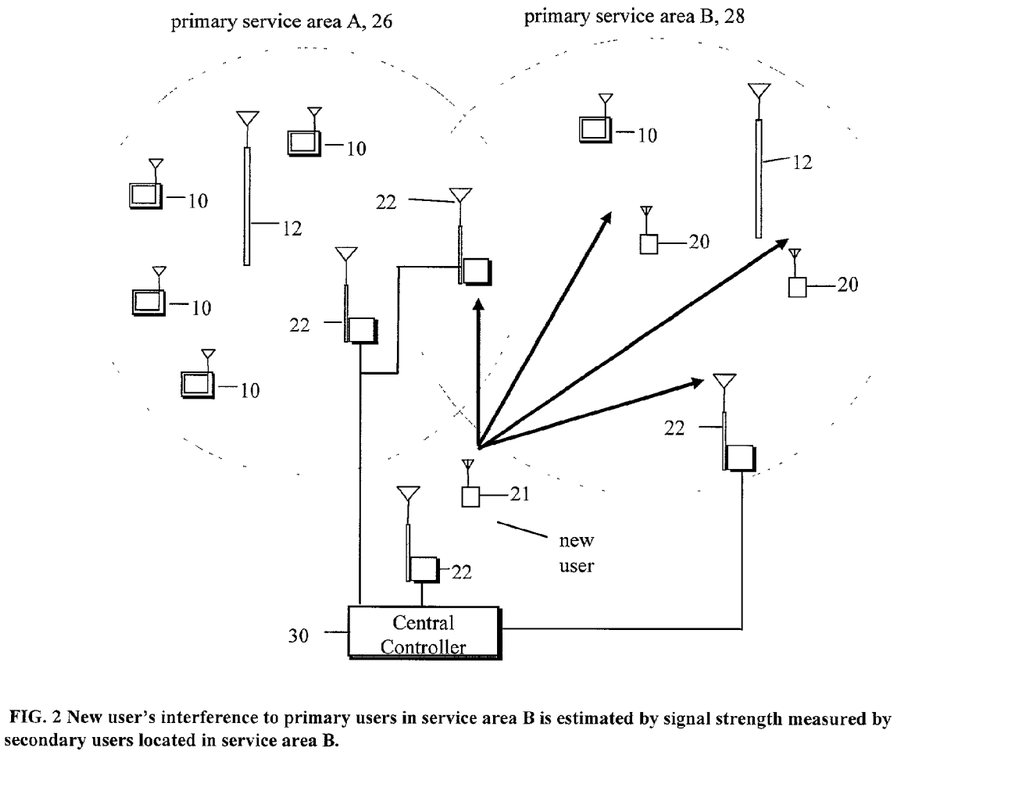
FIG. 2 shows the method to test for potential interference.

FIG. 2 shows a new secondary transceiver 21 that is to be added to the secondary network. To establish connectivity with the secondary network, the new secondary transceiver 21 initially uses a startup channel, which is a primary allocation for the network and is reliable. This may be in the ISM unlicensed band, cellular telephone band, or any other band. The central controller provides the new secondary node 21 a list of channels that are potentially useful based on propagation calculations and channels surrounding secondary transceivers 20 have found don't cause interference.

The new secondary node 21 then measures the primary signal strength in each of the proposed channels. As will be described later, this measurement is coordinated with the secondary signals in the secondary service area 24. During the measurement interval the secondary signals are switched off to prevent the secondary signals from affecting the primary signal measurement. If the primary signal is below a certain value, then the new secondary node 21 is assumed to be located in a region where the channel is potentially available for spectrum reuse. If the primary signal is above another certain value, then the new secondary node 21 is assumed to be located in the primary service region B 28, the channel is not available for spectrum reuse by this node, and this node can be used to received signal probes.

FIG. 2 shows the method to estimate the secondary system's interference to the primary system. In the preferred embodiment of this invention, the vast majority of the primary and secondary users sharing the same channel will be geographically separated by 10's of km and will have low antenna heights (10 m or less). The vast majority of paths between the secondary and primary nodes will not allow line of sight propagation and will have 30 dB to 50 dB of excess propagation loss compared to free space losses. Because of these large losses, the secondary users will not interfere with the primary users and significant reuse of the spectrum is practical.

However, there are a variety of factors which may reduce the propagation losses and create interference: (1) The primary or secondary users may have elevated antennas (100 m or more), (2) incorrect information on the secondary user's location, and (3) unusual propagation due to atmospheric conditions. These conditions are rare but exist often enough that the secondary system must mitigate them in order to operate on a non-interference basis. The conditions also vary with time so they must be mitigated on a regular basis.

Unfortunately, the signal level from each secondary transceiver 20 at each primary receiver 10 can't be measured directly because of the expense in deploying the measurement equipment and the location of the primary receivers 10 may be unknown. Simulations and analysis could be used to estimate these effects, they would require extensive detailed knowledge of all primary users, terrain features and atmospheric data, which is impractical to obtain.

Instead, the secondary signal level at the primary receivers 10 is estimated by the use of propagation models and measuring the secondary signal level at secondary transceiver 20 and secondary base stations 22 surrounding the primary receivers 10. In the example shown in FIG. 2, the new secondary transceiver 21 desires to transmit using channel B without interfering with primary users in service area B 28. Using propagation models and the FCC emitter database, the maximum transmit power that the new secondary transceiver 21 can use without interference to primary receivers 10 in service area B 28 is calculated. The transmit power level is reduced by a certain value (10 dB–20 dB) to account for modeling uncertainties.

The secondary central controller 30 then tasks the new secondary transceiver 21 to transmit a probe signal for a brief period (several milliseconds). The secondary central controller 30 previously coordinates with the secondary transceivers 20 and secondary base stations 22 in service area B 28 so that they measure the probe signal amplitude. The central controller identifies which nodes are within service area B 28 by comparing the primary signal level measurements to a threshold value as previously described. These amplitude values are sent to the secondary central controller 30. If any of the probe signal amplitudes exceed a threshold value, then the maximum transmit power level that the new secondary transceiver 21 can use on channel B is reduced by the amount the maximum measurement exceeded the threshold. The value of the maximum transmission power level is thus equal to the following formula: P_transmission (dBm)=P_probe (dBm)−P_received (dBm)+ "constant", with "P_probe" the probe transmission power level, "P_received" the maximum received probe power level, and the value of the "constant" depending on the maximum interference level allowed in the "primary region" plus a safety margin.

These measurements are repeated at a regular interval (10's of minutes to a few hours) and the probe signal amplitudes are compared to previous values. If there is a significant change due to changes in the secondary equipment (new location, antenna rotations, changes to the system cabling . . .) or due to unusual propagation conditions, the maximum transmit power level that the new secondary transceiver 21 can use on channel B is changed so that the maximum measurement value equals the threshold value.

If the secondary equipment is mobile, than the measurements are made more frequently and the threshold value is set higher to account for lags in transmitting the data to the secondary central controller 30 and other system delays. The probe duration is adjusted to balance the probe measurement time versus probe waveform detection probability and depends on the number of secondary nodes and the node dynamics. In a secondary service area 26 or 28 with 10,000 users, 10% of the capacity allocated to probing, and probing done every hour, the probe duration is approximately 2 ms.

To decrease the amount of time spent probing, groups of secondary transceiver 20 and secondary base stations 22 can transmit the probe signals simultaneously. If the secondary transceivers 20 and secondary base stations 22 in service area B 28 measure a probe signal amplitude greater than the threshold value, then each of the secondary transceiver 20 and secondary base stations 22 can individually re-transmit the probe signal to determine which link will cause interference.

Figure 3:
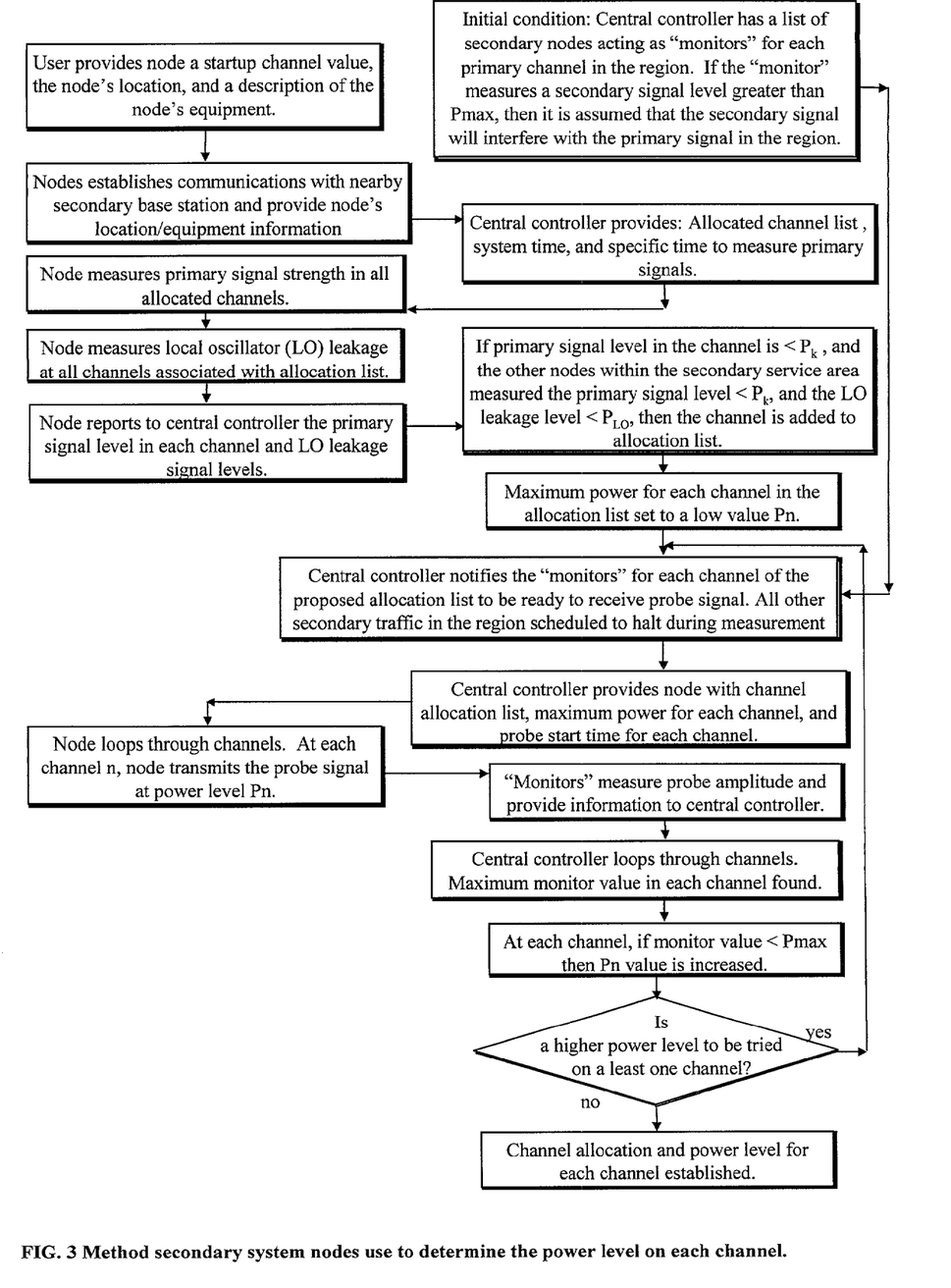
FIG. 3 is a flowchart describing the actions of the secondary node and the central controller to determine which channels are available.

FIG. 3 is a flow chart showing the above procedure used to determine the maximum transmit power level that each secondary transceiver 20 and secondary base station 22 can use.

To minimize the interference to the primary system, the probe waveform is not the same as used to transmit data. The waveform is designed to have minimal effect on the primary waveform, to be easily and quickly acquired by the secondary system, and to have sufficient bandwidth across the channel of interest so that frequency selective fading doesn't introduce large errors. In the preferred embodiment of this invention, one of the following waveforms is used depending of the primary signal modulation.

Figure 4:
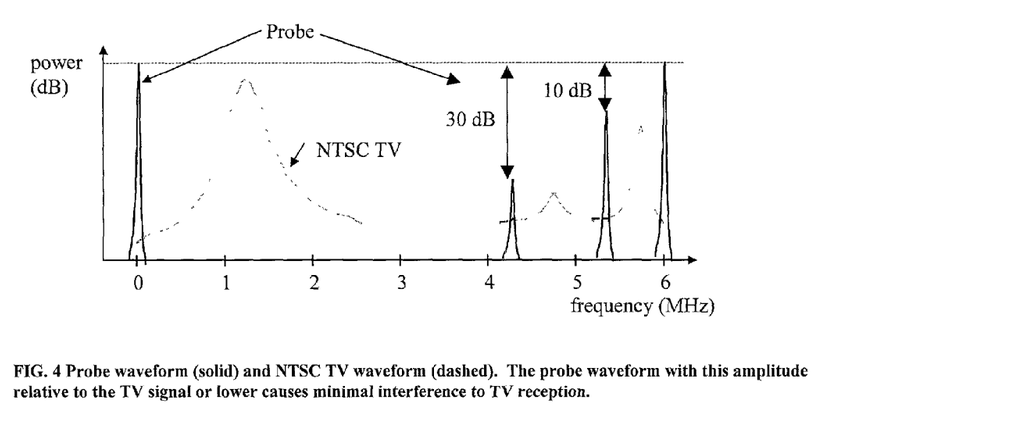
FIG. 4 shows the spectrum of the four-tone probe waveform and the spectrum of an NTSC TV signal.

FIG. 4 shows the probe signal waveform spectrum used with NTSC TV video signals. The signal uses nominally four (with a range from one to twenty) CW tones distributed in four frequency zones in the 6 MHz TV channel. Two of the zones are near the channel frequency start and end values. The third zone frequency limits are 1.5 MHz to 4.5 MHz above the channel start frequency Oust below the color subcarrier frequency). The fourth zone is from 5 MHz to 5.5 MHz above the channel start frequency (between the color subcarrier frequency and aural carrier frequency). Signals in these zone regions can experimentally be shown to: (1) have much less impact to the TV reception than tones at other frequencies and (2) are at frequencies that the NTSC signal spectrum is at minimum values. The tones in each zone can be transmitted at the same time to reduce the probe measurement time or can be transmitted one at a time to minimize the receiver processing requirements.

The value of this waveform is that has approximately the same level of impact to the TV signal as a broadband waveform used to send data, but this waveform can be received with a narrow bandwidth (~10 Hz) receiver compared to a wide bandwidth (several MHz) broadband receiver, thus it can be transmitted at much lower (~50 dB) amplitude and will have minimal impact to the primary signal.

The relative amplitudes of the CW tones in each zone are shown in FIG. 4 and are set to cause nearly the same level of TV interference. Experimentally it can be shown that signals in the in the zones near are the channel frequency start and end values cause approximately the same degradation of the TV signal. The zone from 1.5 MHz to 4.5 MHz above the channel start frequency has signals nominally 30 dB (20 dB to 40 dB range) reduced in amplitude compared to the start and end zone signals. The zone from 5 MHz to 5.5 MHz above the channel start frequency has signals nominally 10 dB (0 dB to 20 dB range) reduced in amplitude compared to the start and end zone signals.

To receive this waveform, standard FFT processing techniques are used to measure the amplitude of each CW tone and the amplitudes are normalized by the 30 dB and 10 dB amounts described above. Selective fading will cause the relative amplitude of each tone to vary just as would occur with a data waveform and must be accounted for to estimate the interference caused by a data waveform. To account for fading, the largest of the four CW tone amplitudes is used to estimate the worse case channel conditions. The probability that all four tones are faded causing the propagation losses to be over estimated is very low.

If the primary signal is other than NTSC TV video signals, the probe signal is a conventional BPSK waveform with bandwidth approximately equal to the channel bandwidth. This sets the chip rate at approximately the inverse of the bandwidth (a 10 MHz bandwidth would have a chip rate of 10 Mcps). The waveform transmits a pseudo random sequence with the maximum length that can be coherently integrated when limited by channel conditions or receiver hardware complexity. In non-line-of-sight (LOS) propagation conditions, the maximum channel coherence time is approximately 100 ms. Current low cost receiver hardware is limited to sampling and processing approximately 10,000 samples. Assuming 2 samples per chip, the maximum sequence is approximately 5,000 samples. Thus, the sequence length is set to the minimum of the chip rate (symbols per second) times 100 ms (the maximum sequence duration) and 5,000.

To receive the BPSK probe signal, the secondary receiver samples the signal for a period equal to the transmit period and using a non-linear technique to measure the amplitude of probe signal. Each sample value is squared and the resulting series analyzed using an FFT. At the frequency corresponding to twice the chip rate, a narrow bandwidth spectral line will exist with amplitude that is related to the received probe signal amplitude. It is well known to those familiar in the art that this technique is able identify BPSK signals with amplitude well below the noise level and provides nearly optimal signal detection performance. Thus, the probe signal can be transmitted at a much lower power level than a regular data signal (which reduces interference to the primary signal) and can still be detected.

Once the probe signal amplitudes are measured at the secondary transceivers 20 and secondary base stations 22 in service area B 28, the values are sent to the secondary central controller 30 who then decides what the maximum power level each secondary transceiver 20 and secondary base station 22 can use with this channel as is described above.

Figure 5:
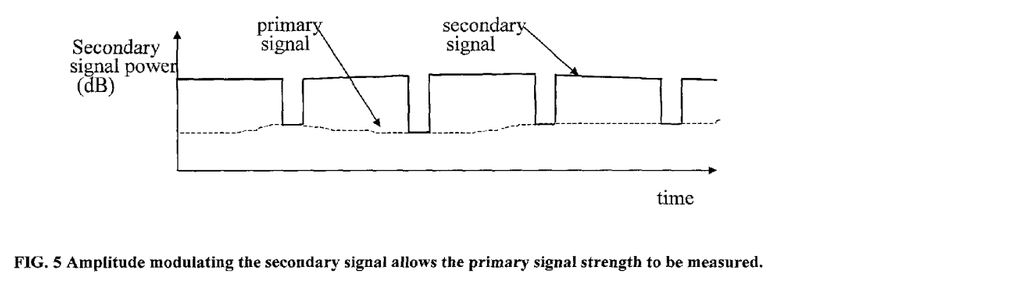
FIG. 5 is a graph that shows the primary and secondary signal strengths versus time at the secondary receiver.

FIG. 5 shows the method used to amplitude modulate the secondary signals. Amplitude modulation is critical because: (1) The primary signal strength must be measured by the secondary system and the primary signal strength will often be lower amplitude than the secondary signal, and (2) the interference caused by the secondary signal must be clearly discernible compared to other causes of reception problems experienced by the primary users.

Figure 6:
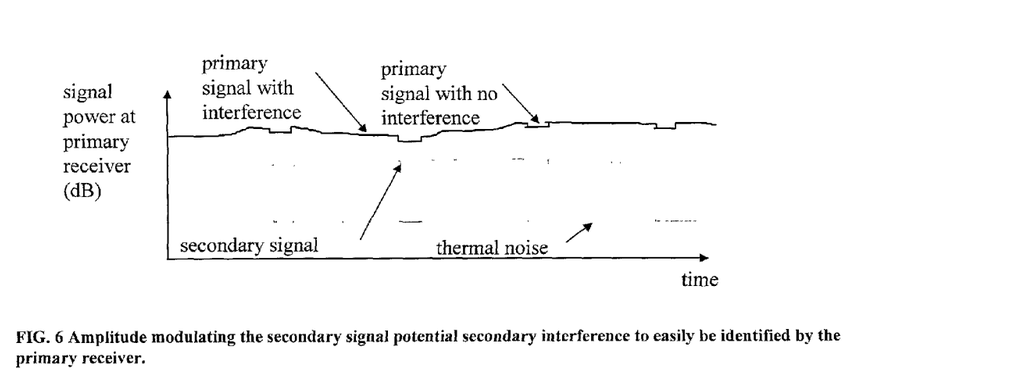
FIG. 6 is a graph that shows the primary and secondary signal strengths versus time at the primary receiver.

FIG. 6 shows the signal level measured at the primary receiver. The primary signal dominates since the secondary signal is very weak because the secondary transceivers 20 and secondary base stations 22 are a significant distance away. However, if the secondary signal amplitude were sufficient to cause interference, the primary user would immediately know the cause because the impairments would periodically cease. In contrast, interference caused by other sources (such as amateur radios, CB radios, the user's equipment degrading, weather conditions, lightning, primary system transmission failures, misadjustment of the primary receiver, etc.) would not have this pattern. It is an extremely critical property that the primary user can immediately and reliably decide if the secondary system is the cause of reception problems. Otherwise, the secondary service provider will be liable for all reception difficulties the primary users encounters that would have severe economic implications.

Figure 7:
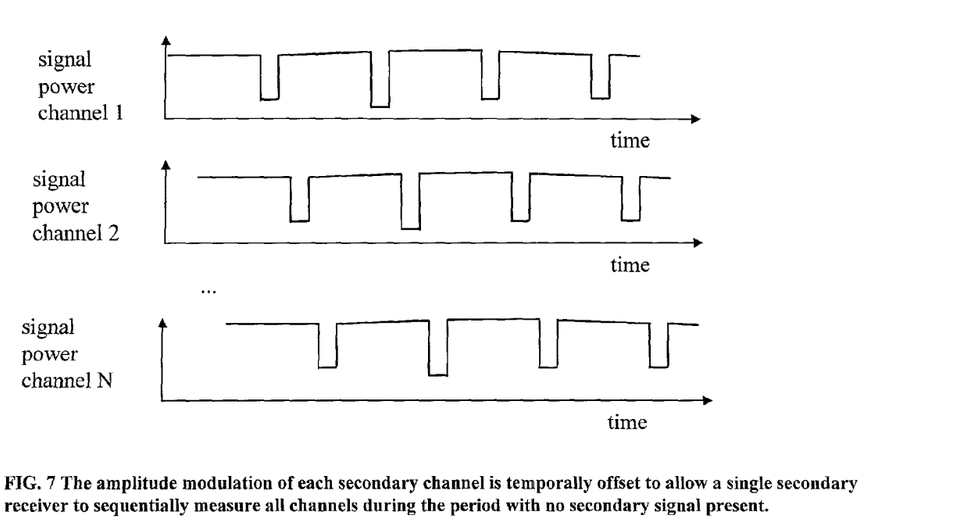
FIG. 7 is a graph that shows the secondary signal modulation phase in different channels.

FIG. 7 shows how the amplitude modulation between different channels is organized. The off periods between channels are staggered in time so that a single receiver at each secondary transceiver 20 or each secondary base station 22 can monitor any or all channels of interest. A unified off period would be highly inefficient since the off period for each channel would have to occur more frequently to allow the multiple channels to be measured. The timing of the off periods is determined by the secondary central controller 30 which periodically sends timing information, a schedule of channel off periods and measurement tasking to the secondary transceivers 20 and secondary base stations 22.

Figure 8:
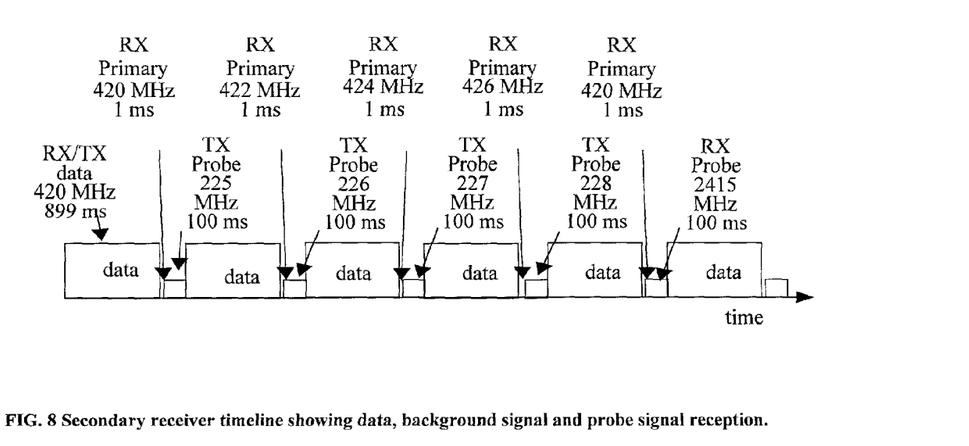
FIG. 8 is a graph of the nominal receiver timeline.

In addition to measuring the primary background signal, each secondary transceiver 20 and secondary base station 22 will send data, receive probe signals and transmit probe signals. This information is sent to the central controller 30 via the high capacity network connecting the base stations 22. The notional time line for a transceiver is shown in FIG. 8. For approximately 90% of the time (899 ms), the transceivers will either transmit or receive data using conventional media access protocols. In the next interval, all secondary transceivers in the region go to a receive-only mode for one millisecond, and receive primary signals either in the channel they are using or on other channels. Then for 100 ms, the secondary transceivers will either transmit or receive a probe signal at frequencies that the node is reserving for future use or at frequencies the other nodes need. These times are the nominal values and can be reduced for latency critical applications or increased for highly mobile applications.

An additional innovation is a technique where the secondary transceivers 20 and base stations 22 modify their behavior when there are nearby primary receivers 10 or transmitters 12. Closely spaced (10's of meters) radios are susceptible to significant interference caused by non-linear mixing interference and interference caused by unintended out-of-band transmitted signals (phase noise, harmonics, and spurs). In the preferred approach, the secondary transceiver and base station (20 and 22) measure the spectrum and identify strong signals that indicate proximate primary transceivers. Each secondary node (20 and 22) will then avoid transmitting on frequencies likely to cause interference to that specific radio. The frequencies to avoid can be determined using a simple model that includes harmonically related signals and cross products of the primary signal with the secondary signal. For example, if a strong cell phone transmission is detected at 890 MHz, it can be inferred that a receiver is nearby tuned to 935 MHz (cell phone channels are paired). The secondary system may have a significant harmonic at 935 MHz when it transmits at 233.75 MHz ($4^{th}$ harmonic is 935 MHz) and at 467.5 MHz ($2^{nd}$ harmonic is 935 MHz). To avoid causing interference, this specific secondary node would restrict its transmitted power at these frequencies to low values or change to another frequency.

Figure 9:
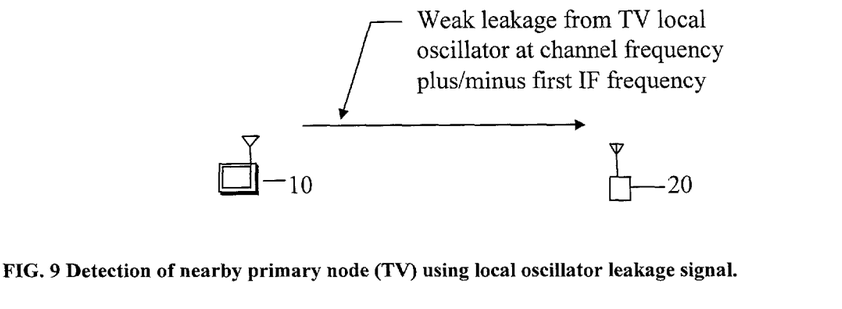
FIG. 9 illustrates the method to detect nearby primary receivers via local oscillator leakage measurements.

In broadcast bands (i.e. TV), the primary receiver's 10 local oscillator leakage will be detected to determine if there is a nearby receiver as shown in FIG. 9. These signals radiate from the primary receiver's 10 antenna and have a power level typically −80 dBm to −100 dBm and can be detected at a range of approximately 10 m to 100 m. This is a well-known technique to detect TV receivers[1] but has never been applied to spectrum management systems before. FIG. 9 indicates how the new secondary node 21 determines if there any primary receivers in close proximity to reduce the chance of adjacent channel interference. A primary receiver 10 located this close will receive the secondary signal with a large amplitude and will have increased probability of adjacent interference. Proximity is determined by measuring the amplitude of continuous wave (CW) signals at frequencies associated with leakage from receiver local oscillators (LO) set to receive signals at the channels of interest. LO signals radiate from the primary receiver's 10 antenna and have power level typically of −80 dBm to −100 dBm and can be detected at a range of approximately 10 m to 100 m. The frequency of the LO signals are standardized and well known. The value is the channel frequency plus the primary receiver's IF frequency. For broadcast NTSC TV the LO signals occur at 45.75 MHz above the video carrier frequency.

[1]U.S. Pat. No. 4577220, Laxton et al, Mar., 1986 and other patents.

To measure the LO signal amplitude, fast Fourier transform (FFT) methods are used to create a narrow (~10 Hz) bandwidth receiver. The LO signals are detected by searching for stable, narrow bandwidth, continuous wave (CW) signals.

Figure 10:
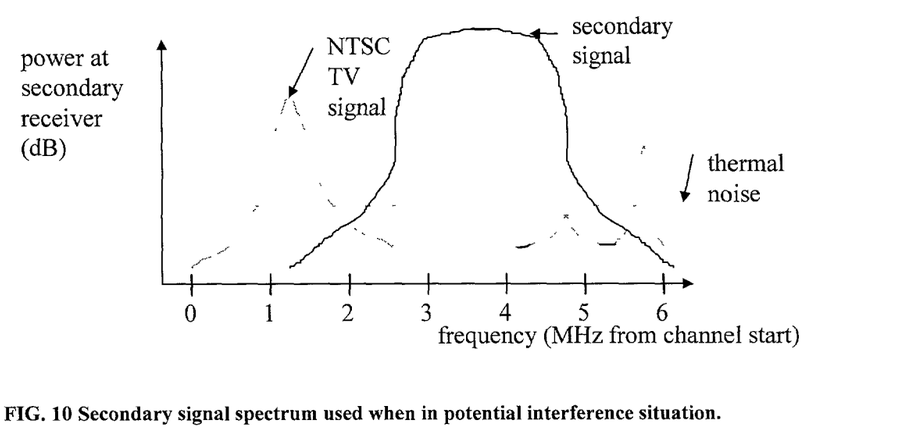
FIG. 10 is a graph the spectrum of the secondary signal and the spectrum of an NTSC TV signal when the TV signal may potentially interfere with the secondary signal
Figure 11:
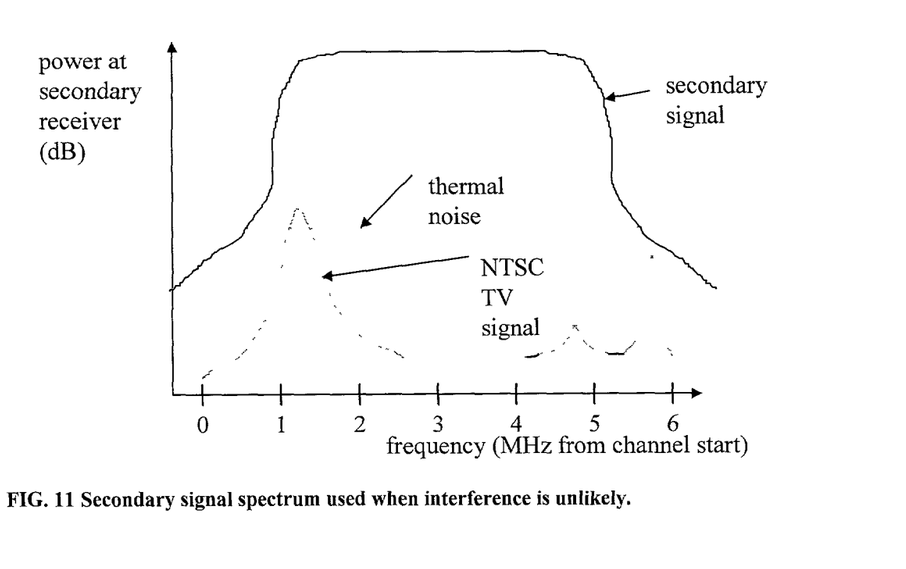
FIG. 11 is a graph the spectrum of the secondary signal and the spectrum of an NTSC TV signal when the TV signal does not interfere with the secondary signal.

FIG. 10 and FIG. 11 show the secondary signal spectrum and how it adapts to the noise level, which includes the primary signal when the primary signal is an NTSC TV signal or another waveform, which doesn't fill the spectrum uniformly. FIG. 10 illustrates how in many cases the primary signal level will be too low for the primary receiver 10 to use, but the signal level will be much higher than the thermal noise level. If the secondary system desires to use this channel it will have to increase the transmitted secondary signal level so that the received signal has the requisite signal to noise ratio for the secondary modulation type. However, increasing the signal power will increase the probability of interference to the primary user and may limit the secondary usage of the channel. FIG. 11 illustrates when the primary signal level is very low and the noise level is effectively that of thermal noise.

In the preferred embodiment of this invention, the secondary signal waveform is selected based on the interference measurements made by the secondary transceivers 20 and secondary base stations 22. If the interference measurements indicate that the primary signal is below the threshold value used to declare the channel open for use and the primary signal level is well above the noise level, then the secondary signal spectrum is reduced to fit into gaps of the primary spectrum (from 1.5 MHz above the channel start frequency to 5.5 MHz above the channel start frequency) as shown in FIG. 10. If the interference measurements indicate that the primary signal is a threshold value near thermal noise, then the secondary signal spectrum is to fit the entire channel width shown in FIG. 11.

Figure 12:
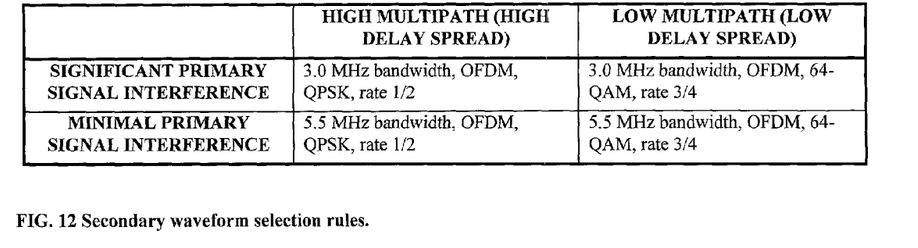
FIG. 12 is a table the shows the waveforms to be used in various conditions.

FIG. 12 shows the rules used to select the secondary waveform type. In addition to changing the waveform based on the level of interference, the waveform is also varied depending on the level of multipath. In high multipath propagation conditions, it is well known that inter-symbol interference severely degrades signal transmission and forces certain waveforms and error correction codes to be used. These waveforms are much less efficient spectrally and transmit much fewer bits per second in a given bandwidth of spectrum. In the preferred embodiment of this invention, the waveform selection is based on the amount of multipath encountered on the specific secondary link between the secondary transceiver 20 and secondary base station 22. If the link can be closed with a more spectrally efficient waveform, then that waveform is used. Otherwise, a more robust but spectrally inefficient waveform is used. In the prior art, the same waveform is used for all links. Because the difference in capacity between these waveforms can exceed a factor of 10, the secondary system capacity can significantly be improved if a large fraction of the links don't have severe multipath.

There are many types of waveforms that could be used to optimize performance in a high multipath link or in high quality (line-of-sight) link. FIG. 12 indicates certain waveform types (OFDM/QPSK, rate ½ and OFDM/64QAM, rate ¾) that are robust against multipath. The invention disclosed here is not dependent on these specific waveform types and others could be used.

Figure 13:
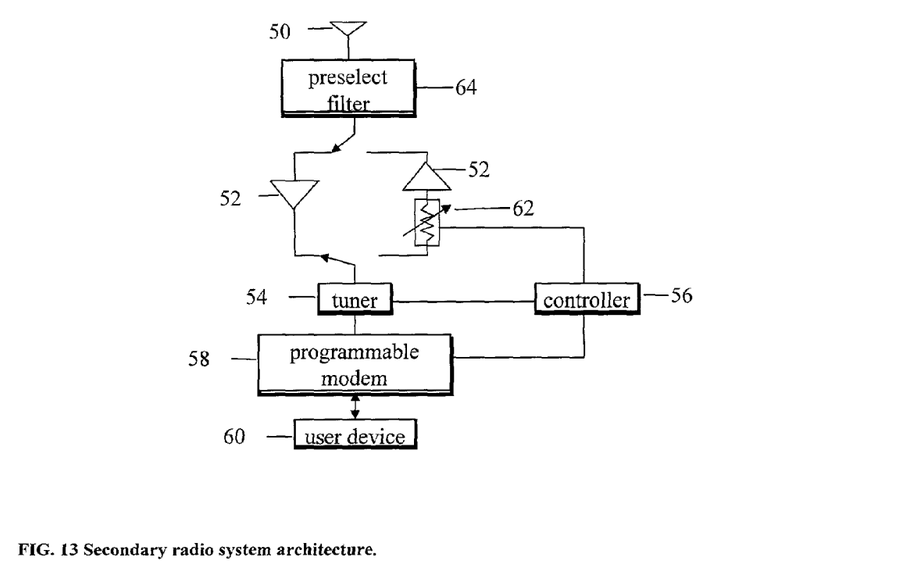
FIG. 13 is a block diagram of the secondary system transceiver.

FIG. 13 illustrates the secondary transceiver 20 and secondary base station 22 radio architecture. A programmable modem 58 is used that can rapidly switch between waveforms. The secondary transceiver 20 modem 58 is able to generate the probe waveform and the waveforms in FIG. 12 can change between them in a few milliseconds. The modem 58 can digitize the intermediate frequency (IF) with at least 5,000 samples and perform an FFT to demodulate the probe signal. A tuner 54 is used that has a range of 54 MHz to 890 MHz when the secondary channels are the TV broadcast bands. The invention disclosed here is not limited to this band and is applicable to anywhere in the spectrum. A controller 56 is used to control the modem 58, the tuner 54, and the transmitter variable attenuator 62. The antenna 50, amplifier 52, and preselect filter 64 are multi-band devices. The user device 60 accommodates voice, data or both.

Figure 14:
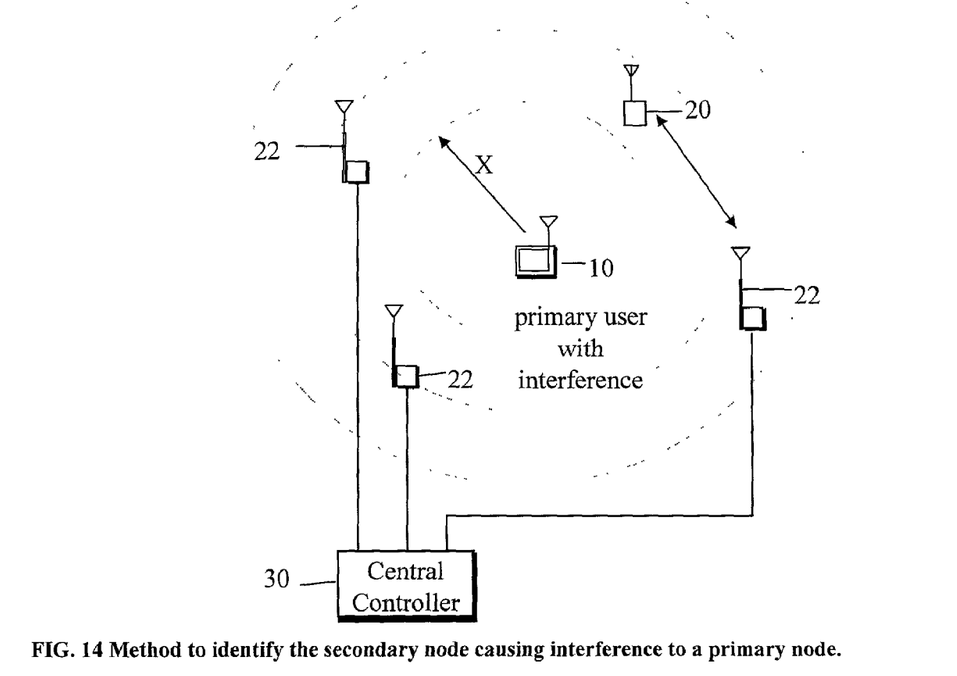
FIG. 14 shows the configuration used to determine which secondary node is causing interference.
Figure 15:
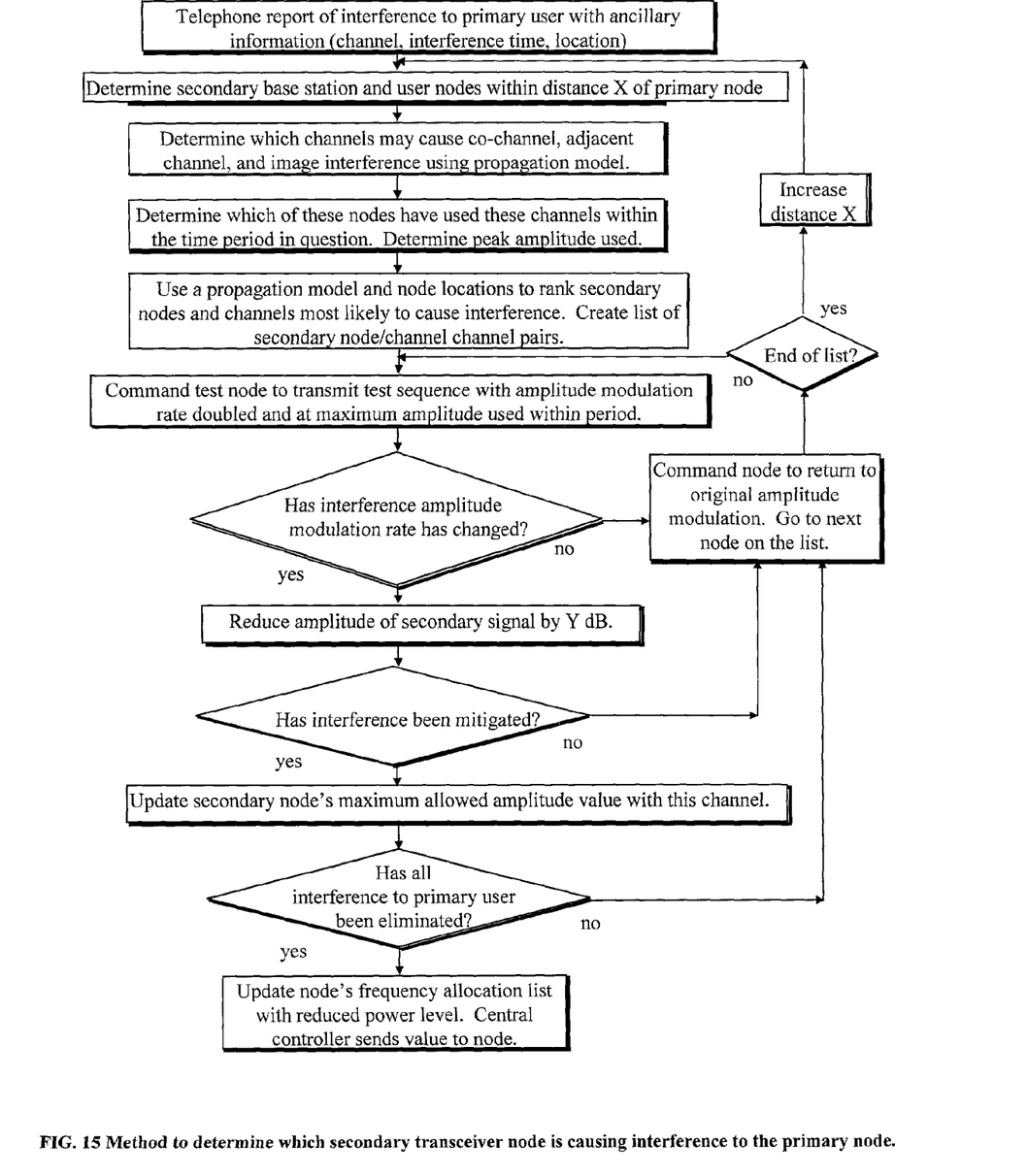
FIG. 15 is a flowchart describing the method used to determine which secondary node is causing interference.

FIG. 14 shows how the present invention mitigates inadvertent interference and FIG. 15 provides a flowchart of the activities. A primary user 10 experiences reception problems and because of the secondary signal's amplitude modulation he or she immediately identifies the problem source. Using a telephone or another rapid electronic method (such as the Internet), he contacts a well-known interference mitigation agent (either a person, a voice recognition computer system, or an fully automated system) that provides information to the secondary central controller 30.

The primary user reports his location, the channel with interference and the time of the interference. The central controller identifies all secondary transceivers 20 and secondary base stations 22 within a distance X of the primary user active within the time period in question, and identifies what additional channels may have caused the interference due to adjacent channel or image rejection problems. Using propagation and interference models, the maximum power each secondary transceiver 20 and secondary base station 22 is allowed to transmit, the probability of each secondary node is calculated. The secondary nodes are sorted by this probability. If the interference is still present, a secondary central controller 30 tasks the most probable secondary node to temporarily cease transmitting and then asks the primary user if the problem has cleared. If not, the secondary central controller 30 goes to the next probable node and repeats this process (expanding the distance X as required) until the offending secondary node is identified.

If the primary user had reported the interference as intermittent (due to variations in the secondary traffic loading), the secondary central controller 30 commands the secondary nodes to transmit for each of the above tests instead of ceasing to transmit.

Once the secondary node causing the interference is identified, the maximum transmit power level that node can transmit in that channel is reduced until there is no interference. This is accomplished by the secondary central controller 30 iteratively tasking the secondary node to transmit signal at varying power levels until the primary user reports no interference.

Figure 16:
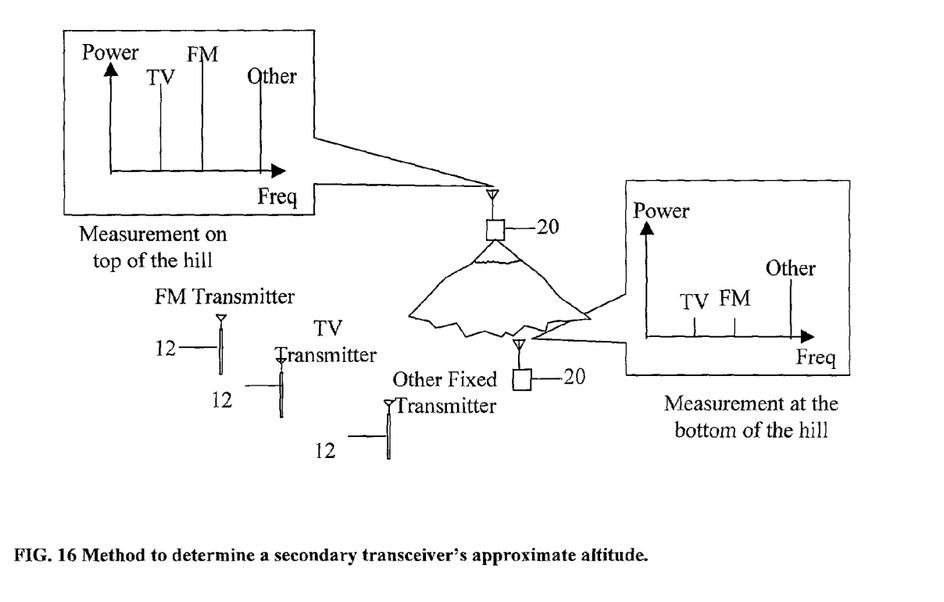
FIG. 16 illustrates the method to determine a secondary node's approximate altitude.

Secondary transceivers 20 and base stations 22 that are highly elevated compared to the surrounding terrain have line-of-sight to a large area and will have much lower propagation losses to the surround primary nodes compared to secondary nodes that are at low altitude. Because they are more likely to cause interference, they are assigned frequencies that are the least likely to cause interference as determined by the probe measurements described above. To determine if a secondary node is elevated, the node measures the strength of several primary signals (at different frequencies) in the area as shown in FIG. 16. The primary signals can be any fixed signal with high duty cycle and constant amplitude received over a large area such as TV or FM broadcast signals. If there are many signals above a certain threshold, then the node has line-of-sight to a large region and is elevated. The exact elevation distance is not determined nor is it required.

In some system applications, the frequency range of the secondary system will not include the standard broadcast bands. The elevation of a secondary node can still be inferred using signals from primary cellular, PCS, or other systems (that are not constant amplitude). These systems use frequency re-use schemes where channels are assigned to different cell towers. If the node is elevated, it will receive strong amplitude signals at many frequencies within the frequency re-use scheme. If the node is not elevated, it will receive strong amplitude signals at only one or two frequencies within the frequency re-use scheme.

Figure 17:
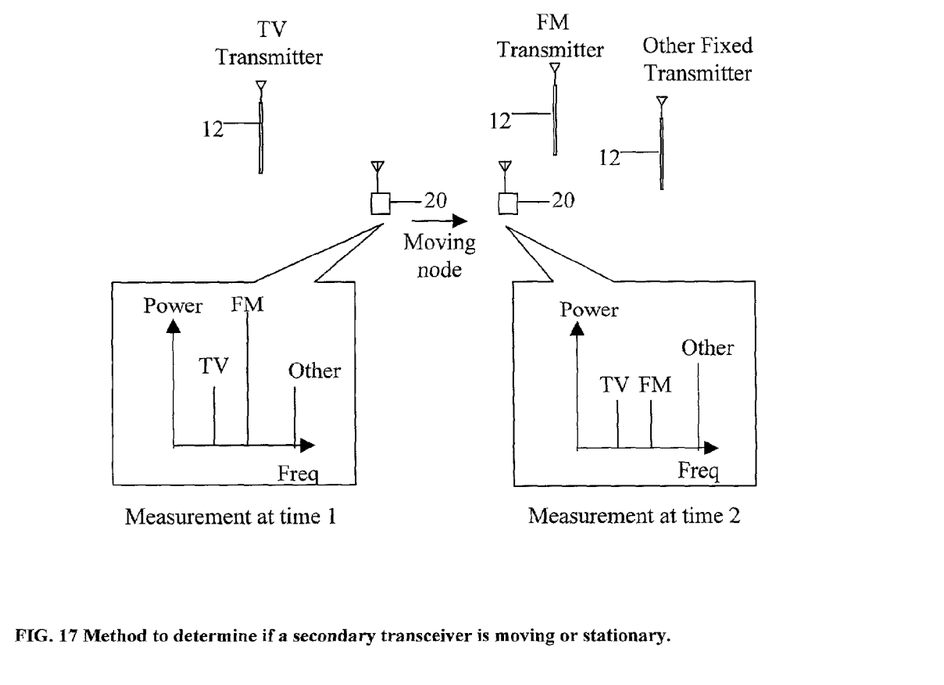
FIG. 17 shows the method to determine if a secondary node is moving or stationary.

As mentioned above, the system will use a slightly different scheme to allocate frequencies for mobile nodes. To determine if a node is stationary or mobile, the system will periodically (approximately once per second) measure the amplitude of background primary signals. As shown in FIG. 17, the background signal amplitudes vary significantly with position. Motions of a fraction of a wavelength cause changes in background signals of several to up to 10's of decibels. The secondary transceiver 20 periodically (approximately every second) measures the amplitude of several background signals from fixed, constant amplitude signals such as TV or FM broadcast signals. If these amplitudes vary more a threshold amount, the secondary transceiver 20 is declared to be mobile and higher probing and measurements rates are made to more rapidly check that the secondary frequency is available. This part of the invention plus the feature to detect node elevation described above enables the invention to continuously monitor the spectrum allocation decisions at a rate suitable for mobile applications.

SUMMARY, RAMIFICATIONS, AND SCOPE

Accordingly, the reader will see that the method described above allows efficient secondary use of spectrum while causing minimum interference to the primary user. The method has minimal impact to the choices of the secondary system could be added as an applique to existing or planned communication systems. It requires no modification to the existing primary user. The technology can be economically built with existing component technology.

The invention will provide 100's of megahertz of spectrum to be used which before was unavailable to new uses and will provide this spectrum below 2 GHz which is the most useful portion for mobile and non-line-of-sight applications. Because the method has minimal effect on the present primary users, it allows a gradual transition from the present fixed frequency based, broadcast use of the spectrum set-up in the 1930's to the computer controlled, fully digital, packet based, frequency agile systems coming in the near future. With the advent of the Internet and the need for high-speed connectivity to rural and mobile users, the present spectrum use methods are inadequate and will not be able to meet this need. This invention will provide spectrum for the new Internet driven demand while not significantly impacting the present spectrum users.

The invention described here has many advantages. The technique used by each secondary node uses multiple effective ways (propagation models, measuring the primary signal level and probing) to identify what channels are available. The technique of amplitude modulating the secondary signals allows accurate measurement of the primary signal levels while the secondary system is operating. Using the special probe waveforms allows these measurements to me made with minimal impact to the primary system. Varying the secondary waveform greatly reduces the impact to the primary system while increasing the capacity of the secondary system. The methods to detect node elevation and node motion allow for rapid checking and adjustment of spectrum allocations making this technique applicable to mobile applications.

Although the description above contains many specifications, these should not be construed as limiting the scope of the invention but as merely providing illustrations of some of the presently preferred embodiments of this invention. For example, the primary system could be the present broadcast TV system. However, the methods described here would be equally effective with sharing between commercial and military systems, with sharing between radar and communications systems and others.

Thus the scope of the invention should be determined by the appended claims and their legal equivalents, rather than by the examples given.

What is claimed is:

1. A method for a network of secondary communication devices consisting of transceivers, base stations and a central controller sharing a radio frequency channel with existing primary users with minimal interference to the primary users comprising the steps of:
   each secondary transceiver and secondary base station measuring the primary signal level in the channel,
   each secondary transceiver communicating the signal level to the central controller, and
   the central controller determining which channels each node may potentially use by comparing the primary signal level to a threshold value,
   wherein a portion of the secondary transceivers and secondary base stations in a region distant from where the channel is being used sequentially transmit a short duration probe signal with a certain power level (P_probe),
   the secondary transceivers and secondary base stations within a primary region where the channel is being used measure the probe signal amplitude value (P_received) and send these values to the central controller, and
   the central controller determines the maximum power level for each secondary transceivers and secondary base stations in the distant region by the formula: P_transmission (dBm)=P_probe (dBm)−P_received (dBm)+constant, with the value of the constant depending on the maximum interference level allowed in the primary region plus a safety margin, and
   the above steps are repeated at regular intervals.

2. The method according to claim 1, further comprising the step of:
   using high processing gain probe waveforms such as, but not limited to, direct sequence waveforms, single or multiple continuous wave (CW) tones.

3. The method of claim 2, wherein the high processing gain probe waveform is either multiple CW waveforms or combinations of narrowband waveforms, each with energy in a frequency zone within the NTSC six MHz channel width and minimal energy at other frequencies in the channel, the frequency zone being in the lower and upper guard bands, between the video carrier and the color-subcarrier, or between the color-subcarrier and the sound carrier.

4. A method for a network of secondary communication devices consisting of transceivers, base stations and a central controller sharing a radio frequency channel with existing primary users with minimal interference to the primary users comprising the steps of:
   each secondary transceiver and secondary base station measuring the primary signal level in the channel,
   each secondary transceiver communicating the signal level to the central controller,
   the central controller determining which channels each node may potentially use by comparing the primary signal level to a threshold value,
   wherein a modulation scheme where each secondary transceiver and secondary base station transmits and receives data for a certain time period, then simultaneously halts transmissions, making measurements of the background signals for a time period, and then either transmitting or receiving probe signals.

5. A method for a network of secondary communication devices consisting of transceivers, base stations and a central controller sharing a radio frequency channel with existing primary users with minimal interference to the primary users comprising the steps of:
   each secondary transceiver and secondary base station measuring the primary signal level in the channel,
   each secondary transceiver communicating the signal level to the central controller,
   the central controller determining which channels each node may potentially use by comparing the primary signal level to a threshold value,
   wherein proximate primary receivers are identified to each secondary transceivers and secondary base stations by having each secondary transceiver and secondary base station measure the strength of all strong signals within a certain range of the spectrum, and
   those signals with a power level above a threshold value declare that these are proximate nodes, and
   determine the proximate radio's receive frequency using well-known standards information, and
   restricting the secondary transceiver's or secondary base station's transmit frequency list from harmonically related values, adjacent channel values, or image related values compared to the primary signal.

6. A method for a network of secondary communication devices consisting of transceivers, base stations and a central controller sharing a radio frequency channel with existing primary users with minimal interference to the primary users comprising the steps of:

each secondary transceiver and secondary base station measuring the primary signal level in the channel,     each secondary transceiver communicating the signal level to the central controller, and     the central controller determining which channels each node may potentially use by comparing the primary signal level to a threshold value,     wherein proximate primary receive only radios are identified to each secondary transceivers and secondary base stations by having each secondary transceivers and secondary base stations measure the strength of the primary receiver's local oscillator leakage, and     and those signals above a threshold value declare that these is a proximate receive-only node, and     determine the proximate receiver's frequency using well-known standards information, and     restricting the secondary transceivers or secondary base station's transmit frequency list from harmonically related values, adjacent channel values, or image related values compared to the primary signal.

7. A method for a network of secondary communication devices to share the analog TV spectrum consisting of the steps of,     each secondary transceivers and secondary base stations measuring the strength of the background TV signal strength, and     if the primary TV signal strength is greater than a certain level above the noise level but less than another higher level, then     the secondary system will use a waveform with energy between 1.5 MHz above the channel start frequency and 4.5 MHz above the channel start frequency to avoid interference caused by the analog video and sound carriers.

8. A method for a network of secondary communication devices consisting of transceivers, base stations and a central controller to identify which device is causing Interference to a primary user comprising of the steps of, a method to unambiguously marking the secondary system's signal when received by the primary receiver such as, but not limited to, amplitude modulating the secondary signal, and     provide a method for the affected primary user to communicate with the secondary system's central controller and communicate the primary receiver's location and the channel frequency, and     the central controller determine the closest secondary transceiver or secondary base station to the primary node and the likely frequencies being transmitted that might cause the interference, and     command the secondary transceiver or secondary base station to transmit data, and     sequentially reducing the power of the closet secondary transceiver or base station until the primary user reports that the problem is resolved, and     if the interference to the primary receiver continues, determine the next closest secondary transceiver or secondary base station to the primary node and repeating the previous step until the secondary node causing the Interference is located.

9. A method for a network of secondary communication devices consisting of transceivers, base stations and a central controller sharing a radio frequency channel with existing primary users with minimal interference to the primary users comprising the steps of:

each secondary transceiver and secondary base station measuring the primary signal level in the channel,     each secondary transceiver communicating the signal level to the central controller, and     the central controller determining which channels each node may potentially use by comparing the primary signal level to a threshold value,     wherein each secondary transceivers arid secondary base stations measures the strength of multiple signals from several other stationary transmitters and by analysis of these signal level amplitudes and if there is significant co-channel interference determines if the secondary transceiver or secondary base station is moving or elevated, and if the secondary transceiver or secondary base station is moving or elevated, then the node will use more conservative spectrum assignments that include one or more of the following: reducing the node's maximum transmitted power, Increasing the repetition rate of the node's probing and primary signal level measurements, and use of another channel.

* * * * *